United States Patent
Zhang et al.

(10) Patent No.: US 11,728,856 B2
(45) Date of Patent: Aug. 15, 2023

(54) USER EQUIPMENT ANTENNA PANEL DISTRIBUTION REPORTING

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/162,892

(22) Filed: Jan. 29, 2021

(65) Prior Publication Data
US 2022/0247461 A1  Aug. 4, 2022

(51) Int. Cl.
| | | |
|---|---|---|
| H04L 5/12 | (2006.01) |
| H04B 7/06 | (2006.01) |
| H04W 76/27 | (2018.01) |
| H04W 24/10 | (2009.01) |
| H04W 72/543 | (2023.01) |

(52) U.S. Cl.
CPC ......... *H04B 7/0608* (2013.01); *H04W 24/10* (2013.01); *H04W 72/543* (2023.01); *H04W 76/27* (2018.02)

(58) Field of Classification Search
CPC .... H04B 7/0608; H04W 76/27; H04W 24/10; H04W 72/087
USPC ........ 375/262, 261, 260, 259, 316, 295, 219
See application file for complete search history.

(56) References Cited

U.S. PATENT DOCUMENTS

| | | | | |
|---|---|---|---|---|
| 2021/0068123 A1* | 3/2021 | Zhu | ...................... | H04B 7/0808 |
| 2021/0273345 A1* | 9/2021 | Moon | .................. | H01Q 21/061 |
| 2021/0281294 A1* | 9/2021 | Takano | .................... | H04B 7/10 |
| 2022/0124642 A1* | 4/2022 | Xu | ...................... | H04B 17/102 |

FOREIGN PATENT DOCUMENTS

| | | |
|---|---|---|
| WO | 2020031762 A1 | 2/2020 |
| WO | 2020228589 A1 | 11/2020 |

OTHER PUBLICATIONS

Ericsson., et al., "Enhancement of MPE Mitigation for Avoiding Link Failure", 3GPP TSG-RAN WG4 Meeting #92, 3GPP Draft, R4-1908718, 3rd Generation Partnership Project (3GPP), Mobile Competence Centre, 650, Route Des Lucioles, F-06921 Sophia-Antipolis Cedex, France, vol. RAN WG4, No. Ljubljana, Slovenia, Aug. 26, 2019-Aug. 30, 2019, Aug. 16, 2019 (Aug. 16, 2019), 3 Pages, XP051771665, Retrieved from the Internet: URL: http://www.3gpp.org/ftp/tsg_ran/WG4_Radio/TSGR4_92/Docs/R4-1908718.zip [retrieved on Aug. 16, 2019] Section 3.
International Search Report and Written Opinion—PCT/US2022/070247—ISA/EPO—dated May 27, 2022.

* cited by examiner

*Primary Examiner* — Zewdu A Kassa
(74) *Attorney, Agent, or Firm* — Patterson + Sheridan, L.L.P.

(57) ABSTRACT

Certain aspects of the present disclosure provide techniques for user equipment (UE) antenna panel distribution reporting. Particular aspects provide a method performed by a user equipment (UE), which generally includes determining a set of antenna panels of the UE for uplink antenna panel selection based on at least one criterion and transmitting a report to a base station (BS) including an indication of the determined set of antenna panels of the UE.

26 Claims, 7 Drawing Sheets

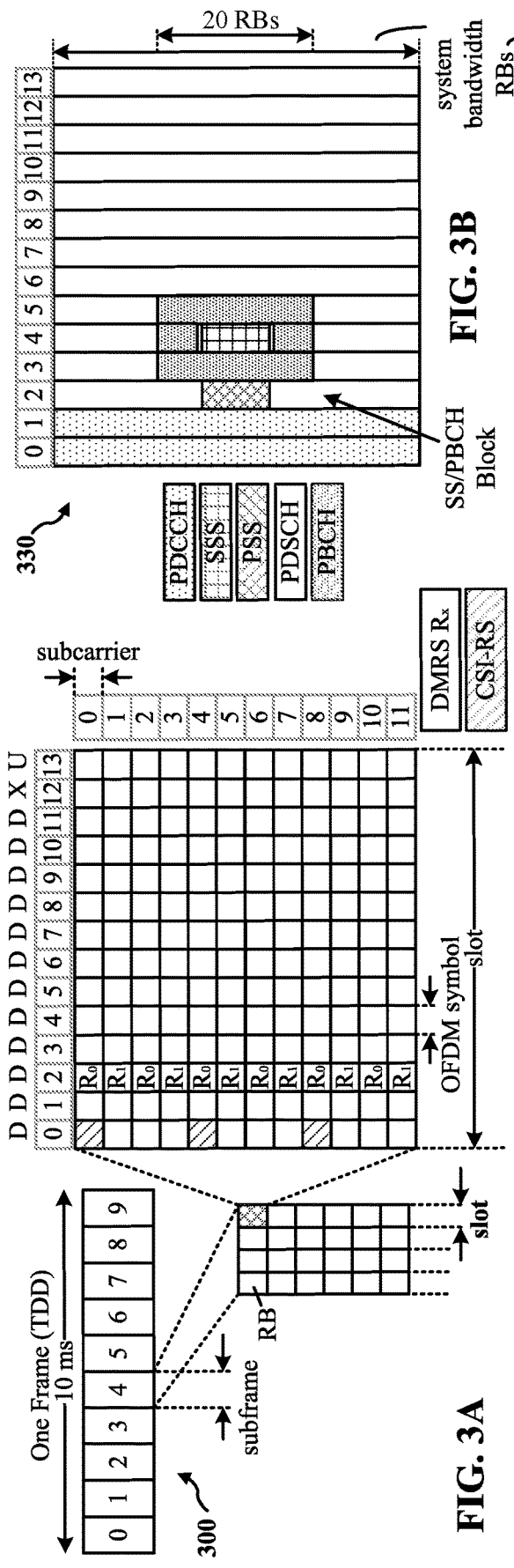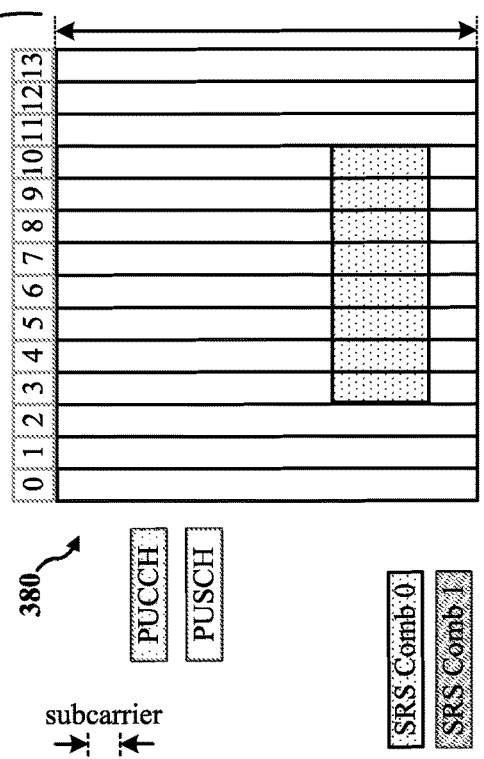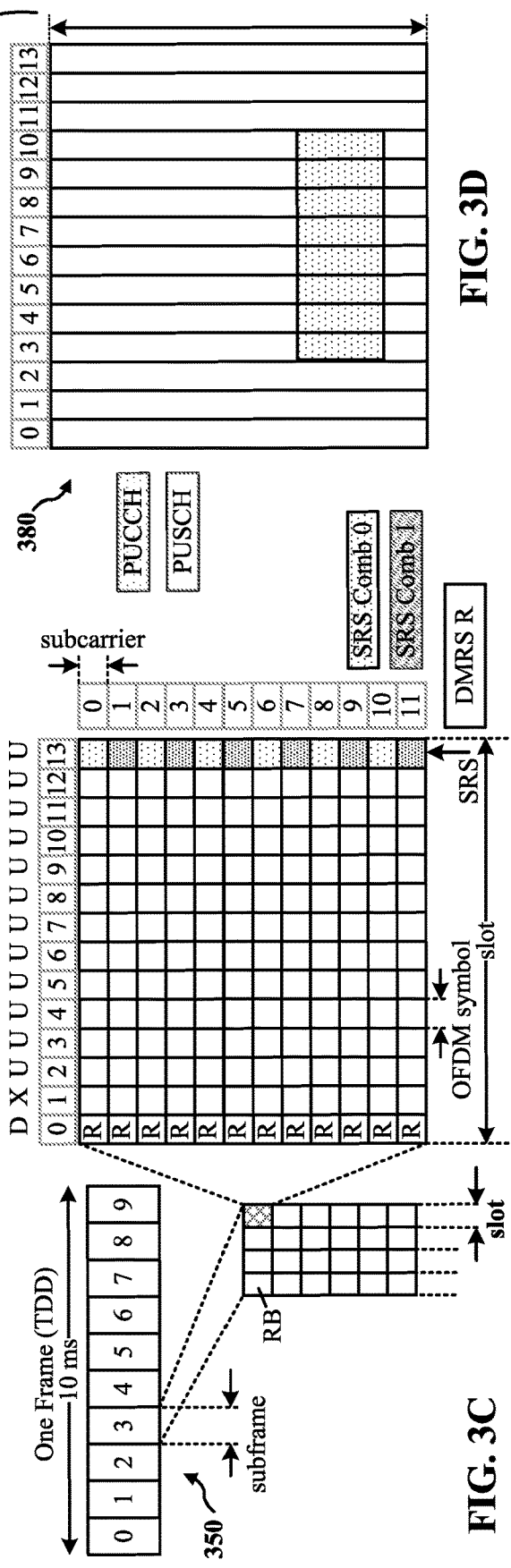

USER EQUIPMENT ANTENNA PANEL DISTRIBUTION REPORTING

BACKGROUND

Aspects of the present disclosure relate to wireless communications, and more particularly, to techniques for user equipment (UE) antenna panel distribution reporting.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, challenges may include an amount of overhead signaling needed for user equipments with multiple antenna panels. Consequently, there exists a need for further improvements in wireless communications systems to overcome various challenges.

SUMMARY

Certain aspects can be implemented in a method for wireless communication by a user equipment (UE). The method generally includes determining a set of antenna panels of the UE for uplink antenna panel selection based on at least one criterion and transmitting a report to a base station (BS) including an indication of the determined set of antenna panels of the UE.

Certain aspects can be implemented in an apparatus for wireless communication by a user equipment (UE). The apparatus may include a processing system, comprising: a memory comprising computer-executable instructions and one or more processors configured to execute the computer-executable instructions and cause the processing system to: determine a set of antenna panels of the UE for uplink antenna panel selection based on at least one criterion and transmit a report to a base station (BS) including an indication of the determined set of antenna panels of the UE.

Certain aspects can be implemented in an apparatus for wireless communication by a user equipment (UE). The apparatus may include means for determining a set of antenna panels of the UE for uplink antenna panel selection based on at least one criterion and means for transmitting a report to a base station (BS) including an indication of the determined set of antenna panels of the UE.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: determine a set of antenna panels of the UE for uplink antenna panel selection based on at least one criterion and transmit a report to a base station (BS) including an indication of the determined set of antenna panels of the UE.

Certain aspects can be implemented in a computer program product for wireless communication by a user equipment (UE) embodied on a computer-readable storage medium. The computer-readable storage medium may comprise code for determining a set of antenna panels of the UE for uplink antenna panel selection based on at least one criterion and transmitting a report to a base station (BS) including an indication of the determined set of antenna panels of the UE.

Certain aspects can be implemented in a method for wireless communication by a base station (BS). The method generally includes receiving a report from a user equipment (UE) including an indication of a set of antenna panels of the UE for uplink antenna panel selection at the UE, wherein set of antenna panels is based on at least one criterion and transmitting, to the UE, a same set of operation parameters for antenna panels of the UE in the set of antenna panels.

Certain aspects can be implemented in an apparatus for wireless communication by a base station (BS). The apparatus may include a processing system, comprising: a memory comprising computer-executable instructions and one or more processors configured to execute the computer-executable instructions and cause the processing system to: receive a report from a user equipment (UE) including an indication of a set of antenna panels of the UE for uplink antenna panel selection at the UE, wherein set of antenna panels is based on at least one criterion and transmit, to the UE, a same set of operation parameters for antenna panels of the UE in the set of antenna panels.

Certain aspects can be implemented in an apparatus for wireless communication by a base station (BS). The apparatus may include means for receiving a report from a user equipment (UE) including an indication of a set of antenna panels of the UE for uplink antenna panel selection at the UE, wherein set of antenna panels is based on at least one criterion and means for transmitting, to the UE, a same set of operation parameters for antenna panels of the UE in the set of antenna panels.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: receive a report from a user equipment (UE) including an indication of a set of antenna panels of the UE for uplink antenna panel selection at the UE, wherein set of antenna panels is based on at least one criterion and transmit, to the UE, a same set of operation parameters for antenna panels of the UE in the set of antenna panels.

Certain aspects can be implemented in a computer program product for wireless communication by a user equipment (UE) embodied on a computer-readable storage medium. The computer-readable storage medium may comprise code for receiving a report from a user equipment (UE) including an indication of a set of antenna panels of the UE for uplink antenna panel selection at the UE, wherein set of antenna panels is based on at least one criterion and transmitting, to the UE, a same set of operation parameters for antenna panels of the UE in the set of antenna panels.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE FIGURES

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide systems and methods for user equipment (UE) antenna panel distribution reporting for fast uplink antenna panel selection. For example, in some cases, a UE in a wireless communications network may determine a set of antenna panels of the UE based on at least one criterion and may transmit a report of the determined set of antenna panels to a base station (BS). In some cases, the at least one criterion may include, for example, a distance between antenna panels included in the determined set of antenna panels and/or a same set of operation parameters shared among antenna panels included in the set of antenna panels. By reporting antenna panels of the UE that are closely distanced from one another or that share a same set of operation parameters, overhead signaling in the wireless communications network may be reduced as the BS need not individually (re)configure each antenna panel of the UE with unique/individual operation parameters. In other words, the BS may be able to configure the antenna panels in the determined set of antenna parameters with a same set of operation parameters, thereby reducing overhead signaling. Additionally, as the UE does not need to receive and decode unique configuration information for each antenna panel, power consumption at the UE may be reduced.

Introduction to Wireless Communication Networks

Figure 1:
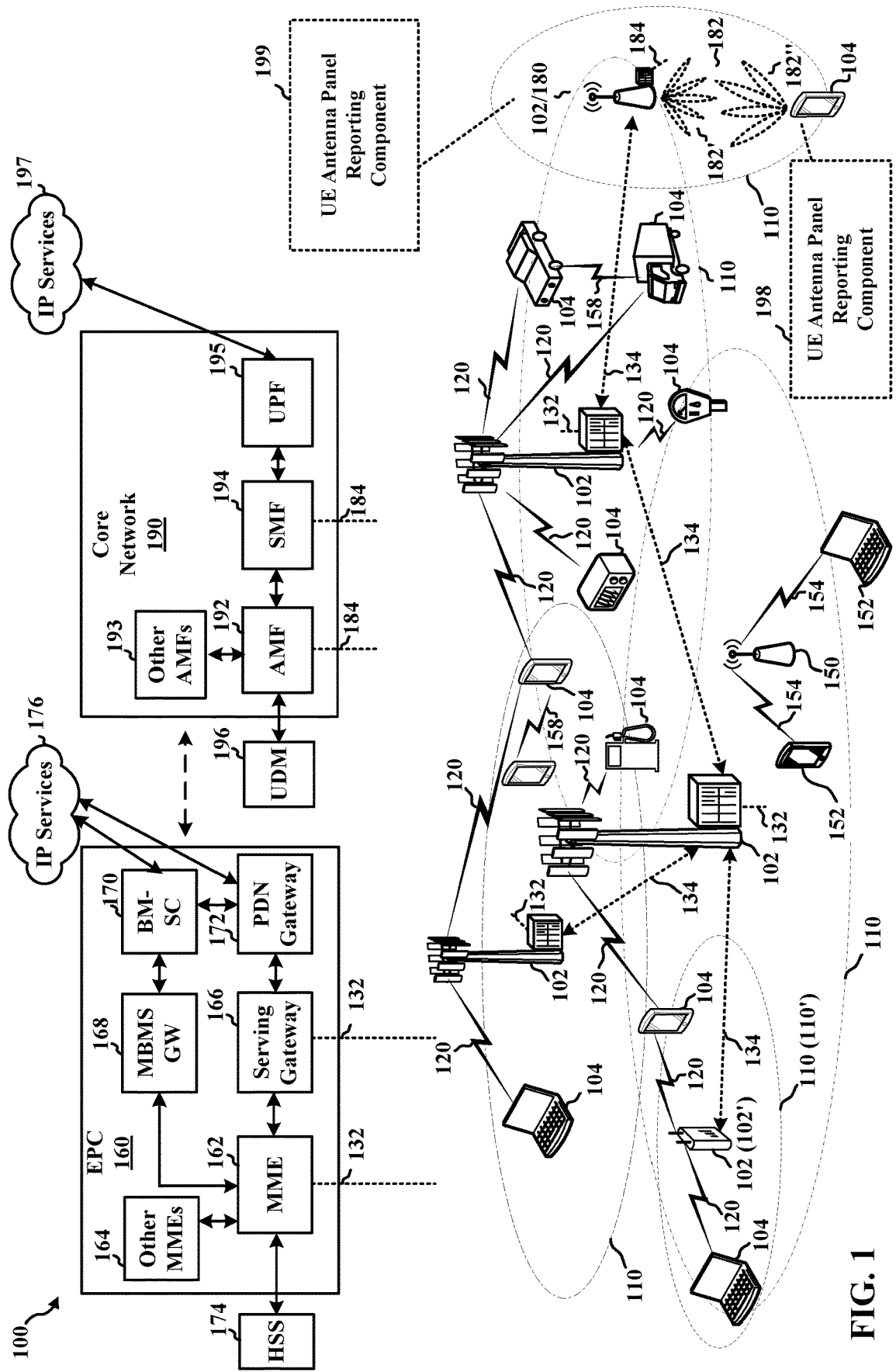
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 4:
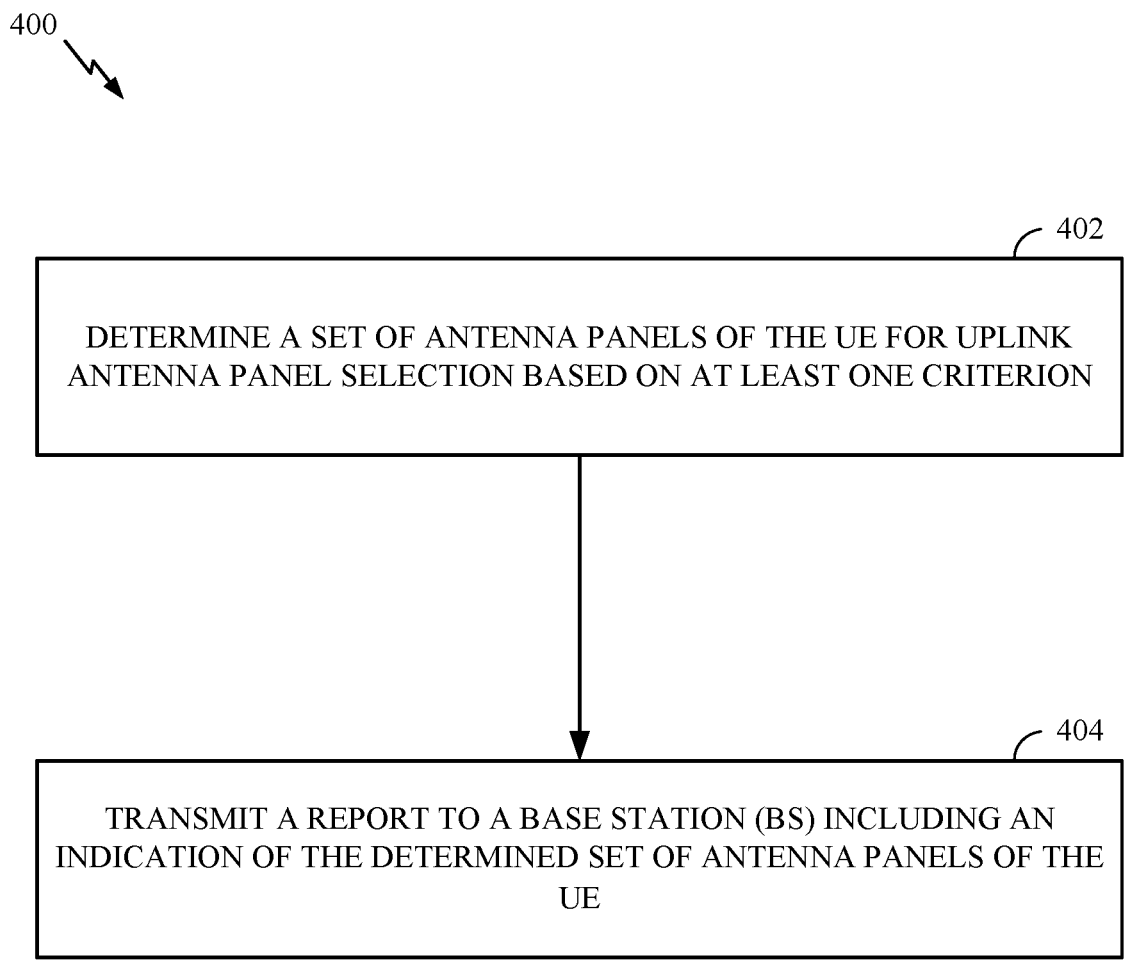
FIG. 4 is a flow diagram illustrating example operations for wireless communication by a user equipment (UE), in accordance with certain aspects of the present disclosure.
Figure 5:
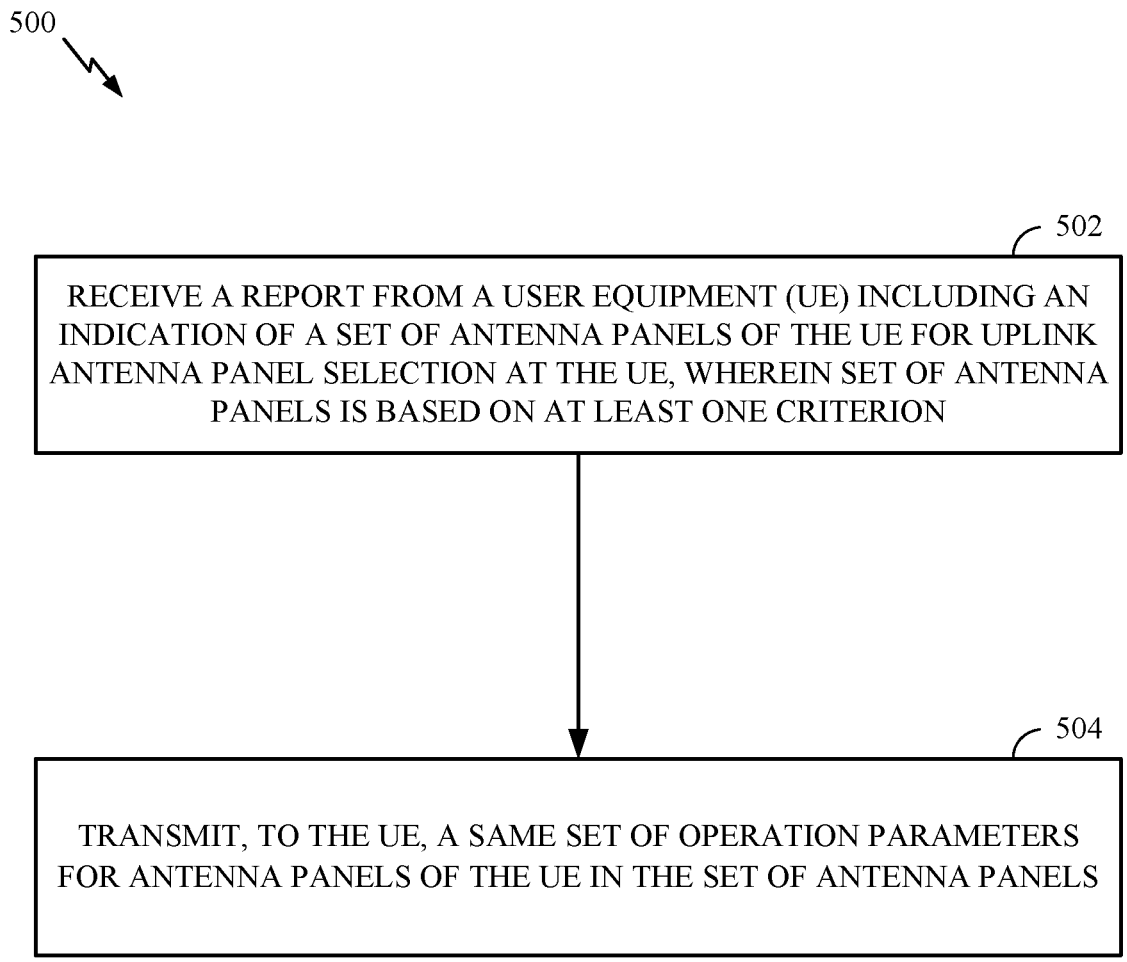
FIG. 5 is a flow diagram illustrating example operations for wireless communication by a base station (BS), in accordance with certain aspects of the present disclosure.

As shown base station 102 in the wireless communication network 100 includes a UE antenna panel reporting component 199, which may be configured to perform the operations shown in FIG. 5, as well as other operations described herein for UE antenna panel distribution reporting. Additionally, as shown, the UE 104 may include a UE antenna panel reporting component 198, which may be configured to perform the operations shown in FIG. 4, as well as other operations described herein for UE antenna panel distribution reporting.

Figure 2:
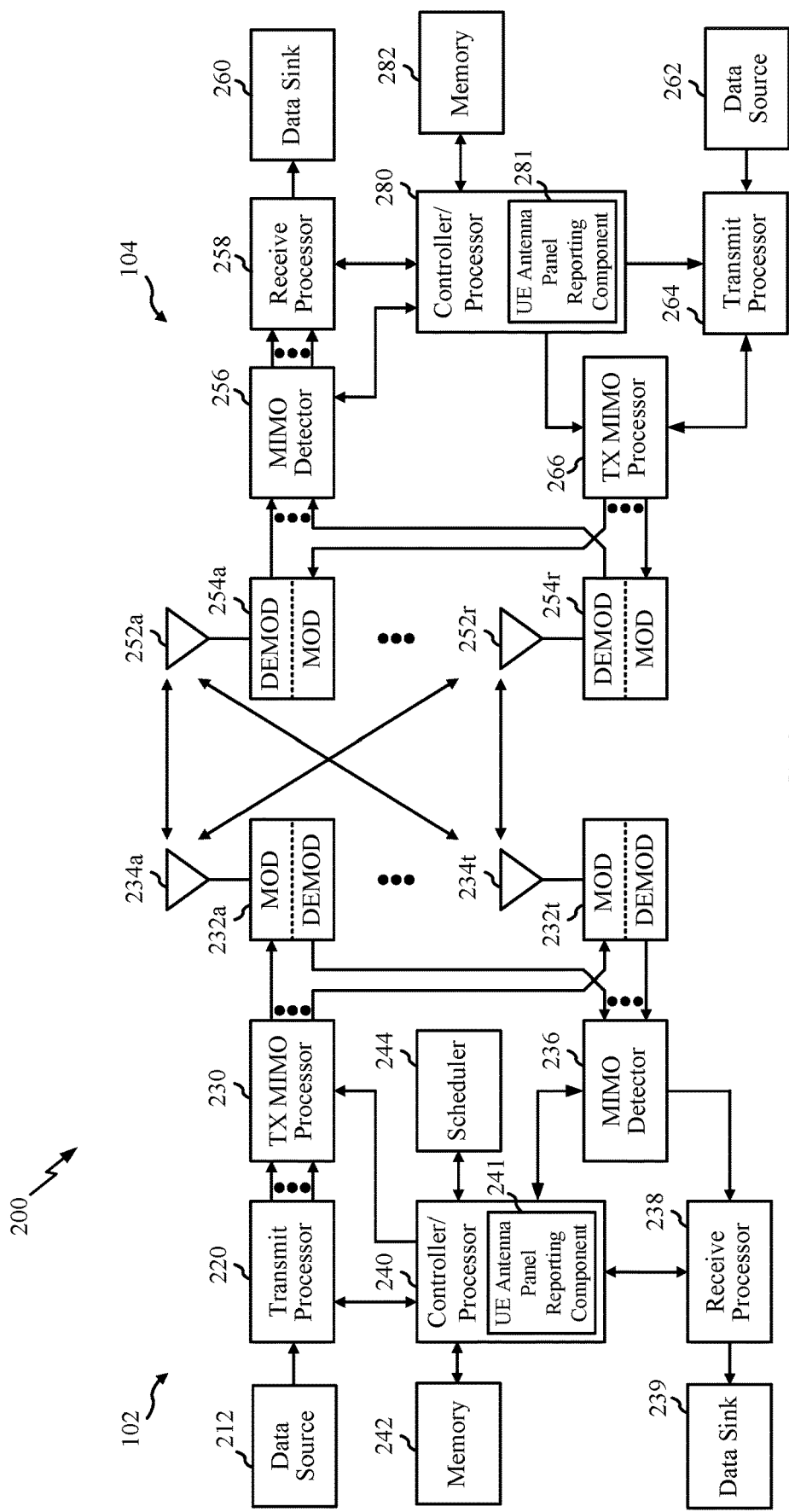
FIG. 2 is a block diagram conceptually illustrating aspects of an example base station (BS) and user equipment (UE).

FIG. 2 depicts aspects of a base station (BS) 102 and a user equipment (UE) 104.

Generally, BS 102 includes various processors (e.g., 220, 230, 238, and 240), antennas 234a-t, transceivers 232a-t, and other aspects, which are involved in transmission of data (e.g., source data 212) and reception of data (e.g., data sink 239). For example, BS 102 may send and receive data between itself and UE 104. BS 102 includes controller/processor 240, which comprises UE antenna panel reporting component 241. UE antenna panel reporting component 241 may be configured to implement UE antenna panel reporting component 199 of FIG. 1.

Generally, UE 104 includes various processors (e.g., 258, 264, 266, and 280), antennas 252a-r, transceivers 254a-r, and other aspects, involved in transmission of data (e.g., data source 262) and reception of data (e.g., data sink 260). UE 104 includes controller/processor 280, which comprises UE antenna panel reporting component 281. UE antenna panel reporting component 281 may be configured to implement UE antenna panel reporting component 198 of FIG. 1.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

In certain aspects, a wireless device, such as a BS, UE, integrated backhaul and access network (IAB-network) node (IAB-node) that supports a mobile telecommunication (MT) function, etc., may be capable of transmit/receive (Tx/Rx) beam correspondence. Beam correspondence relates to receive (Rx) beams and transmit (Tx) beams which are spatial beams for receiving and transmitting signals formed by beamforming by a wireless device.

Beam correspondence may mean that a Tx beam may be used to determine a corresponding Rx beam or an Rx beam may be used to determine a corresponding Tx beam for wireless communications. As discussed, a UE and BS may each be capable of beamforming for both receiving and transmitting wireless signals. Accordingly, each of the UE and BS may receive signals directionally over one or more respective Rx beams (referred to as UE Rx beams for the UE and BS Rx beams for the BS), and each of the UE and BS may transmit signals directionally over one or more respective Tx beams (referred to as UE Tx beams for the UE and BS Tx beams for the BS). In certain aspects, beam correspondence as discussed herein corresponds to beam correspondence as defined in 3GPP TR 38.802.

For example, a BS is capable of Tx/Rx beam correspondence if at least one of the following conditions is satisfied: 1) a BS is able to determine a BS Rx beam for uplink reception based on a UE's downlink measurement of one or more BS Tx beams; or 2) a BS is able to determine a BS Tx beam for downlink transmission based on the BS's uplink measurement on one or more BS Rx beams.

Further, a UE is capable of Tx/Rx beam correspondence if at least one of the following is satisfied: 1) a UE is able to determine a UE Tx beam for uplink transmission based on the UE's downlink measurement on one or more UE Rx beams; or 2) a UE is able to determine a UE Rx beam for downlink reception based on a BS's uplink measurement of one or more UE Tx beams.

In certain aspects, a UE may report its beam correspondence capability to a BS upon receiving an explicit request from the BS such as described in 3GPP TS 38.331. The BS may then select different beam management approaches based on a UE's reported capability.

Aspects Related to UE Antenna Panel Distribution Reporting

In certain systems, such as the wireless communication network 100 of FIG. 1, a UE may be able to transmit or receive transmissions using multiple antennas, beams, and/or antenna panels (e.g., antenna element arrays). An antenna panel may comprise a collection of transceiver units (TXRUs) that are capable of generating one analog beam. In some cases, when a dual-polarized array is used, the one beam may correspond to two antenna ports. In some cases, same sets or different sets of UE panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels of a UE can constitute the same as well as different numbers of antenna ports, a number of beams, and/or an effective isotropic radiated power (EIRP). In some cases, while different antenna panels may share a same number of beams, there may not be beam correspondence across different antenna panels of the UE. Further, in some cases, each antenna panel of the UE may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

A UE's capability to perform transmissions using multiple panels may be especially useful for higher frequency transmission, such as millimeter wave transmissions. In some cases, the transmissions may be received from or transmitted to a serving base station (BS) or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

In some cases, when performing uplink transmissions, the UE may need to perform fast uplink antenna panel selection in different scenarios to quickly select (e.g., low latency) which antenna panel to perform the uplink transmissions. For example, a first scenario may include a maximum permissible emission (MPE) event involving a first antenna panel. For example, in some cases, the first antenna panel may become blocked by a portion of a user's body. In such cases, continuing to transmit using the blocked first antenna panel may lead this portion of the user's body being subjected to a power or energy density that is above an MPE limit. Thus, to mitigate the MPE event (e.g., blockage) associated with the first antenna panel, the UE may select and switch to a second antenna panel that is not blocked to perform uplink transmissions.

Another scenario that may be taken into account when performing uplink antenna panel selection may be associated with power savings at the UE. For example, in some cases, different antenna panels may operate under different power saving modes. In some cases, one antenna panel may be operating in a deep sleep power saving mode while another antenna panel may be active. In such cases, instead of using the antenna panel in deep sleep (e.g., which would require a significant amount of power and time to wake up this antenna panel), the UE may decide to select and switch to the active antenna to perform uplink transmissions.

Another scenario that may be taken into account when performing uplink antenna panel selection may be based on uplink interference management. For example, in some cases, transmission beams of one antenna panel may experience high interference. In such cases, the UE may decide to switch to another antenna panel to perform uplink transmission that is not associated with the high interference.

Another scenario associated with performing uplink antenna panel selection may take into account the support for different configurations (e.g., beam configurations, transmit power, power control parameters, an uplink timing advance, and the like) across different antenna panels. For example, in some cases, a UE may use two different antenna panels to receive two different transmission beams from a base station (e.g., gNB) or two different a transmission reception points (TRPs) of the base station. In such cases, the UE may need to select from different beams on different panels based on the different configurations for these panels Additionally, another scenario associated with performing uplink antenna panel selection may involve uplink transmissions to multiple TRPs. For example, in some cases, the UE may transmit to two different TRPs of a base station simultaneously. Accordingly, the UE may need to determine which antenna panels to perform the uplink transmissions to each of the two different TRPs.

In some cases, to facilitate fast uplink panel selection in case of one of the scenarios described above, the UE may need configuration information (e.g., one or more parameters) from the base station for each antenna panel of the UE. The configuration information may include one or more parameters (e.g., an indication of a beam configuration, a transmit power, power control parameters, an uplink timing advance, and the like) for performing uplink transmissions (e.g., uplink data or reference signals) on a respective antenna panel. However, receiving configuration information for each individual antenna panel of the UE may increase an amount of overhead signaling in the wireless communications network (e.g., consuming a significant amount of time and frequency resources) and may lead to an increase of power consumption at the UE associated with receiving and decoding the overhead signaling. Moreover, such overhead signaling for each antenna panel may be wasted in certain scenarios, such as when antenna panels of the UE operate under similar channel conditions or share similar operation parameters and, thus, may not necessarily need to be configured individually.

Thus, aspects of the present disclosure provide techniques for facilitating fast uplink antenna panel selection when performing uplink transmissions while reducing power consumption at the UE and the amount of overhead signaling required to configure antenna panels for the uplink transmissions. For example, in some cases, such techniques may include determining an antenna panel distribution or set of antenna panels of the UE for uplink antenna panel selection (e.g., for performing uplink transmissions using a selected antenna panel) based on at least one criterion and transmitting a report to a base station (BS) including an indication of the determined set of antenna panels of the UE. The BS may receive the report, including the indication of the determined set of antenna panels, and transmit configuration information to the UE that includes a same set of operation parameters for each antenna panel of the UE included in the set of antenna panels indicated in the received report.

By configuring the UE with a same set of operation parameters for the antenna panels included in the set of antenna panels, the BS may reduce the amount of overhead signaling (e.g., saving time and/or frequency resources in the wireless communication network) and power consumption at the UE (e.g., since the UE does not have to receive and decode configuration information for each individual antenna panel). Further, when a certain scenario related to fast uplink antenna panel selection arises during uplink transmissions, such as when an MPE event occurs, the UE may be able to quickly switch from a first antenna panel in the set of antenna panels to a second antenna panel in the set of antenna panels that uses the same set of operation parameters as the first antenna panel, thereby reducing the latency associated with the uplink transmissions.

FIG. 4 is a flow diagram illustrating example operations 400 for wireless communication, in accordance with certain aspects of the present disclosure. The operations 400 may be performed, for example, by a UE (e.g., such as the UE 104 in the wireless communication network 100 of FIG. 1). The operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280 of FIG. 2) obtaining and/or outputting signals.

The operations 400 may begin, in block 402, by determining a set of antenna panels of the UE for uplink antenna panel selection based on at least one criterion.

In block 404, the UE transmits a report to a base station (BS) including an indication of the determined set of antenna panels of the UE.

FIG. 5 is a flow diagram illustrating example operations 500 for wireless communication, in accordance with certain aspects of the present disclosure. The operations 500 may be performed, for example, by a BS (e.g., such as the BS 102 in the wireless communication network 100 of FIG. 1). The operations 500 may be complementary to the operations 400 performed by the UE as describe with respect to FIG. 4. The operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240 of FIG. 2) obtaining and/or outputting signals.

The operations 500 may begin, in block 502, by receiving a report from a user equipment (UE) including an indication of a set of antenna panels of the UE for uplink antenna panel selection at the UE, wherein set of antenna panels is based on at least one criterion.

At block 504, the BS transmits, to the UE, configuration information comprising a same set of operation parameters for antenna panels of the UE in the set of antenna panels.

Additional Details Regarding UE Antenna Panel Distribution Reporting

As noted above, in block 402 of FIG. 4, the UE may determine a set of antenna panels of the UE (e.g., an antenna panel distribution) for uplink antenna panel selection based on at least one criterion. In some cases, the UE may determine the set of antenna panels based on a request received from the BS to report the indicated set of antenna panels of the UE. In some cases, the request may be received in channel state information (CSI) reporting configuration information or a UE capability information enquiry. In other cases, the UE may autonomously determine the set of antenna panels and transmit the report indicating the determined set of antenna panels without receiving a request from the BS.

In some cases, the at least one criterion may comprise a distance between antenna panels included in the determined set of antenna panels. For example, in some cases, the UE may include antenna panels within the determined set of antenna panels that are within a threshold distance from each other. Accordingly, in some cases, the UE may select a first antenna panel and at least a second antenna panel to include in the determined set of antenna panels. In some cases, the UE may select at least the second antenna panel based on a distance between the first antenna panel and the second antenna panel being less than or equal to a threshold distance. In some cases, the threshold distance may be defined in a wireless communications standard and pre-configured in the UE. In other cases, the threshold distance may be received in signaling from the BS. For example, in some cases, the threshold distance may be received in radio resource control (RRC) signaling from the BS. In other cases, the threshold distance may be received in a media access control control element (MAC-CE) from the BS. In other cases, the threshold distance may be received in downlink control information (DCI) from the BS. Additionally, in some cases, the at least one criterion may include differences in hardware capabilities between panels. For example, in some cases, the UE may select antenna panels to be included within the determined set of antenna panels that share the same or similar hardware capabilities According to aspects, the rationale behind selecting antenna panels that are within a threshold distance to each other or that share the same or similar hardware capabilities may be that, since these antenna panels are located close together and share the same or similar hardware capabilities, channel conditions associated with the antenna panels may be similar. Accordingly, since the channel conditions of the antenna panels included in the determined set of antenna panels may be similar, these antenna panels may be configured by the BS with a same set of operation parameters (e.g., as explained below), thereby reducing the amount of overhead signaling within the wireless communication network.

According to aspects, after determining the set of antenna panels, in block 404 of FIG. 4, the UE may transmit a report including an indication of the determined set of antenna panels of the UE, which may be received by the BS in block 502 of FIG. 5. For example, with respect to the previous example involving the first antenna panel and the second antenna panel, in some cases, the report transmitted by the UE to the BS may include an indication of the determined set of antenna panels which includes the first antenna panel of the UE and the second antenna panel of the UE. The UE may identify the antenna panels included in the determined set of antenna panels in different ways. For example, in some cases, the indication of the determined set of antenna panels may include, a different antenna panel identifier (ID) for each antenna panel included in the determined set of antenna panels or a group antenna panel ID for a group of antenna panels in the determined set of antenna panels. For example, in some cases, the indication of the determined set of antenna panels may include a first antenna panel ID corresponding to the first antenna panel, a second antenna panel ID corresponding to the second antenna panel, or an antenna panel group ID of an antenna panel group that includes at least the first antenna panel and the second antenna panel. In some cases, the antenna panel ID and/or antenna panel group ID may include at least one of a beam group ID, a transmission configuration indicator (TCI) state pool ID, a sounding reference signal (SRS) resource group ID, a control resource set (CORESET) pool ID, or closed loop power control index.

In some cases, the at least one criterion for determining the set of antenna panels for uplink panel selection in block 402 of FIG. 4 may include a same set of operation parameters shared among antenna panels included in the set of antenna panels. In other words, the UE may select antenna panels to include within the determined set of antenna panels based on whether the antenna panels included within the determined set of antenna panels share a same set of operation parameters. In some cases, the operation parameters included in the same set of operation parameters shared among the antenna panels included in the set of antenna panels may include, for example, an uplink (UL) time advance parameter, an uplink transmission power parameter, uplink power control parameters, and the like.

According to aspects, the rationale behind selecting antenna panels that share the same set of operation parameters may be that, since these antenna panels share the same set of operation parameters, if the set of operation parameters needs to be updated by the BS (e.g., due to changes in channel conditions, location of the UE, etc.), the BS may be able to transmit a same updated set of operation parameters for the antenna panels in the determined set of antenna panels. As such, overhead signaling in the wireless communication network may be reduced as the BS need not individually transmit updated operation parameters for each respective antenna panel of the UE.

Accordingly, in the case of antenna panels sharing a same set of operation parameters, determining the set of antenna panels in block 404 of FIG. 4 may include, for example, selecting a first antenna panel to include in the set of antenna panels and selecting at least a second antenna panel to include in the set of antenna panels based on the second antenna panel sharing the same set of operation parameters with the first antenna panel. Thereafter, after determining the set of antenna panels, such as the first antenna panel and the second antenna panel, the UE may transmit a report to the BS that includes an indication of the determined set of antenna panels. In some cases, as noted above, the indication of the determined set of antenna panels may include a first antenna panel ID corresponding to the first antenna panel, a second antenna panel ID corresponding to the second antenna panel, or an antenna panel group ID of an antenna panel group that includes at least the first antenna panel and the second antenna panel.

In some cases, the at least one criterion for determining the set of antenna panels for uplink panel selection in block 402 of FIG. 4 may include, for example, channel conditions associated with antenna panels included in the determined set of antenna panels. For example, in some cases, the UE may select antenna panels to include in the determined set of antenna panels that have, or are associated with, similar channel conditions. The rationale behind selecting antenna panels that share similar channel conditions may be that, since these antenna panels share the similar channel conditions, the operation parameters associated with these antenna panels should be similar and, thus, the BS may be able to configure these antenna panels with the same operation parameters instead of configuring them individually (e.g., thereby reducing overhead signaling).

In some cases, the UE may determine the channel conditions associated with antenna panels based on one or more reference signals (RSs). For example, in some cases, the UE may receive channel state information (CSI) reporting configuration information from the BS, that configures the UE to report CSI feedback based on the one or more RSs (e.g., CSI RSs). In some cases, as noted above, the CSI reporting configuration information may also include a request for the UE to transmit the report including the indication of the set of antenna panels for uplink panel selection.

In such cases, the UE may perform one or more channel measurements on the one or more RSs based on the CSI reporting configuration to determine channel conditions associated with different antenna panels. Thereafter, based on the one or more channel measurements, the UE may select antenna panels to include in the set of antenna panels with similar channel conditions. Thereafter, the UE may transmit the report with the indication of the determined set of antenna panels with similar channel conditions. In some cases, the report may comprise a CSI report and may further includes CSI feedback based on the one or more channel measurements. In some cases, the CSI feedback included in the CSI report may be antenna-panel-specific. In other words, the UE may provide different CSI feedback for each different antenna panel of the UE.

According to aspects, after transmitting the report to the BS with the indication of the determined set of antenna panels of the UE in block 404 of FIG. 4, the BS may transmit configuration information to the UE in block 504 of FIG. 5 for one or more antenna panels of the UE included in the set of antenna panels. In some cases, configuration information comprises a same set of operation parameters for each antenna panel of the one or more antenna panels of the UE in the determined set of antenna panels. In some cases, the configuration information including the operation parameters may be event triggered or periodically or aperiodically updated. Accordingly, when updated, antenna panels included in the determined set of antenna panels may be reconfigured based on the updated configuration information. The UE may then perform uplink transmissions using one or more of the antenna panels in the determined set of antenna panels using the updated configuration information.

Fast Uplink Panel Selection Based on Detected MPE Event

In some cases, certain scenarios may occur when performing uplink transmissions in which the UE may need to perform fast uplink panel selection to switch between antenna panels. As described above, one such scenario may include the detection of an MPE event in which a portion of a user of the UE blocks an antenna panel used for the uplink transmissions. In some cases, detecting the MPE event and switching antenna panels may include the following.

For example, in some cases, the determined set of antenna panels may include at least a first antenna panel and a second antenna panel. As described above, the first antenna panel and the second antenna panel may be included in the determined set of antenna panels when a distance between the first antenna panel and the second antenna panel is less than or equal to a threshold distance and/or when the first antenna panel and the second antenna panel share a same set of operation parameters.

According to aspects, the UE may transmit uplink signaling via the first antenna panel. Thereafter, at some point in time, a portion of the user of the UE may block the first antenna panel. In response, the UE may detect an MPE event involving the first antenna panel (e.g., the blocking of the first antenna panel). To avoid surpassing an MPE level associated with the first antenna panel, the UE may decide to switch to the second antenna panel to transmit the uplink signaling in response to the detected MPE event. According to aspects, because the first antenna panel and the second antenna panel share the same set of operation parameters, as described above, the latency associated with switching between the first antenna panel and the second antenna panel may be reduced.

In some cases, the decision to switch to the second antenna panel (e.g., as opposed to some other antenna panel in the determined set of antenna panels) may be based on a defined rule shared between the UE and the BS that specifies to switch to the second antenna panel in response to a detected MPE event. In other cases, the decision to switch to the second antenna panel may be based on signaling transmitted from the UE to the BS indicating that the UE is switching to the second antenna panel. In other cases, the decision to switch to the second antenna panel may be based on signaling received from the BS indicating to switch to the second antenna panel. In other cases, the decision to switch to the second antenna panel may be based on a determination to switch to the second antenna panel without transmission of signaling to the BS indicating that the UE is switching to the second antenna panel.

Example Wireless Communication Devices

Figure 6:
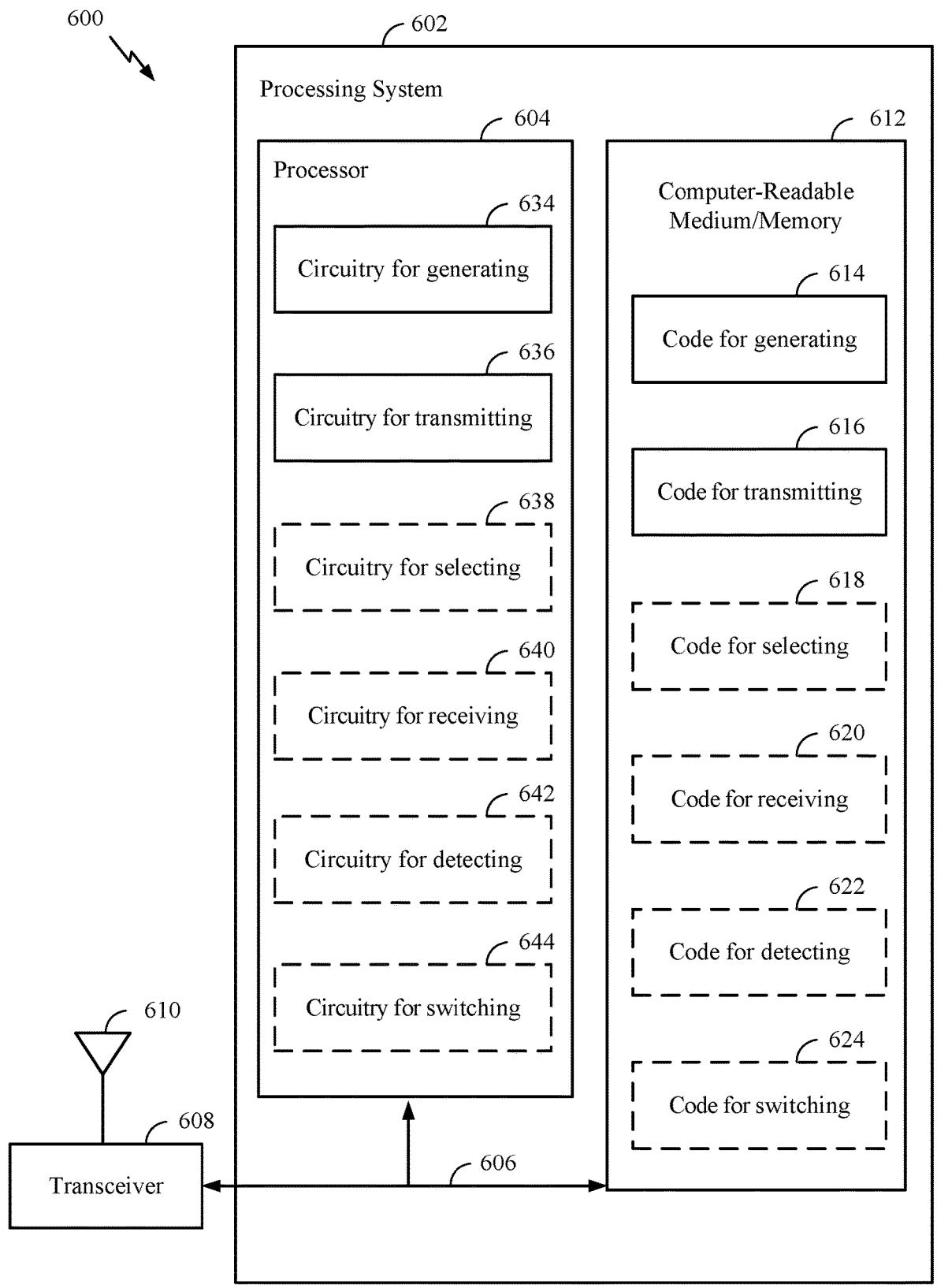
FIG. 6 illustrates an example wireless communications device configured to perform operations for the methods disclosed herein, in accordance with certain aspects of the present disclosure.

FIG. 6 illustrates a communications device 600 that may include various components (e.g., corresponding to means-plus-function components) configured to perform operations for the techniques disclosed herein, such as the operations illustrated in FIG. 4.

Communications device 600 includes a processing system 602 coupled to a transceiver 608 (e.g., a transmitter and/or a receiver). Transceiver 608 is configured to transmit and receive signals for the communications device 600 via an antenna 610, such as the various signals as described herein. Processing system 602 may be configured to perform processing functions for communications device 600, including processing signals received and/or to be transmitted by communications device 600.

Processing system 602 includes a processor 604 coupled to a computer-readable medium/memory 612 via a bus 606. In certain aspects, computer-readable medium/memory 612 is configured to store instructions (e.g., computer-executable code) that when executed by processor 604, cause processor 604 to perform the operations illustrated in FIG. 4 or other operations for performing the various techniques discussed herein for UE antenna panel distribution reporting. In some cases, the processor 604 can include one or more components of UE 104 with reference to FIG. 2 such as, for example, controller/processor 280 (including the antenna panel reporting component 281), transmit processor 264, receive processor 258, and/or the like. Additionally, in some cases, the computer-readable medium/memory 612 can include one or more components of UE 104 with reference to FIG. 2 such as, for example, memory 282 and/or the like.

In certain aspects, computer-readable medium/memory 612 stores code 614 for determining, code 616 for transmitting, code 618 for selecting, code 620 for receiving, code 622 for detecting, and code 624 for switching.

In some cases, code 614 for determining may include code for determining a set of antenna panels of the UE for uplink antenna panel selection based on at least one criterion.

In some cases, code 616 for transmitting may include code for transmitting a report to a base station (BS) including an indication of the determined set of antenna panels of the UE.

In some cases, code 618 for selecting may include code for selecting a first antenna panel to include in the determined set of antenna panels.

In some cases, code 618 for selecting may include code for selecting at least a second antenna panel to include in the determined set of antenna panels based on a distance between the first antenna panel and the second antenna panel being less than or equal to a threshold distance.

In some cases, code 620 for receiving may include code for receiving configuration information for one or more antenna panels of the UE included in the determined set of antenna panels indicated to the BS.

In some cases, code 616 for transmitting may include code for transmitting uplink signaling via the first antenna panel.

In some cases, code 622 for detecting may include code for detecting a maximum permissible exposure (MPE) event involving the first antenna panel.

In some cases, code 624 for switching may include code for switching to the second antenna panel to transmit the uplink signaling in response to the detected MPE event.

In certain aspects, processor 604 has circuitry configured to implement the code stored in the computer-readable medium/memory 612. For example, processor 604 includes circuitry 634 for determining, circuitry 636 for transmitting, circuitry 638 for selecting, circuitry 640 for receiving, circuitry 642 for detecting, and circuitry 644 for switching.

In some cases, circuitry 634 for determining may include circuitry for determining a set of antenna panels of the UE for uplink antenna panel selection based on at least one criterion.

In some cases, circuitry 636 for transmitting may include circuitry for transmitting a report to a base station (BS) including an indication of the determined set of antenna panels of the UE.

In some cases, circuitry 638 for selecting may include circuitry for selecting a first antenna panel to include in the determined set of antenna panels.

In some cases, circuitry 638 for selecting may include circuitry for selecting at least a second antenna panel to include in the determined set of antenna panels based on a distance between the first antenna panel and the second antenna panel being less than or equal to a threshold distance.

In some cases, circuitry 640 for receiving may include circuitry for receiving configuration information for one or more antenna panels of the UE included in the determined set of antenna panels indicated to the BS.

In some cases, circuitry 636 for transmitting may include circuitry for transmitting uplink signaling via the first antenna panel.

In some cases, circuitry 642 for detecting may include circuitry for detecting a maximum permissible exposure (MPE) event involving the first antenna panel.

In some cases, circuitry 644 for switching may include circuitry for switching to the second antenna panel to transmit the uplink signaling in response to the detected MPE event.

In some cases, the operations illustrated in FIG. 4, as well as other operations described herein for UE antenna panel distribution reporting, may be implemented by one or means-plus-function components. For example, in some cases, such operations may be implemented by means for determining, means for transmitting (or means for outputting for transmission), means for selecting, means for receiving (or means for obtaining), means for detecting, and means for switching.

In some cases, means for transmitting (or means for outputting for transmission) includes the transmitter unit 254 and/or antenna(s) 252 of the UE 104 illustrated in FIG. 2 and/or circuitry 628 for transmitting of the communication device 600 in FIG. 6.

In some cases, means for receiving (or means for obtaining) includes the receiver and/or antenna(s) 252 of the UE 104 illustrated in FIG. 2 and/or circuitry 626 for receiving of the communication device 600 in FIG. 6.

In some cases, means for determining, means for selecting, means for detecting, and means for switching, includes a processing system, which may include one or more processors, such as the receive processor 258, the transmit processor 264, the TX MIMO processor 266, and/or the controller/processor 280 of the UE 104 illustrated in FIG. 2 and/or the processing system 602 of the communication device 600 in FIG. 6.

Figure 7:
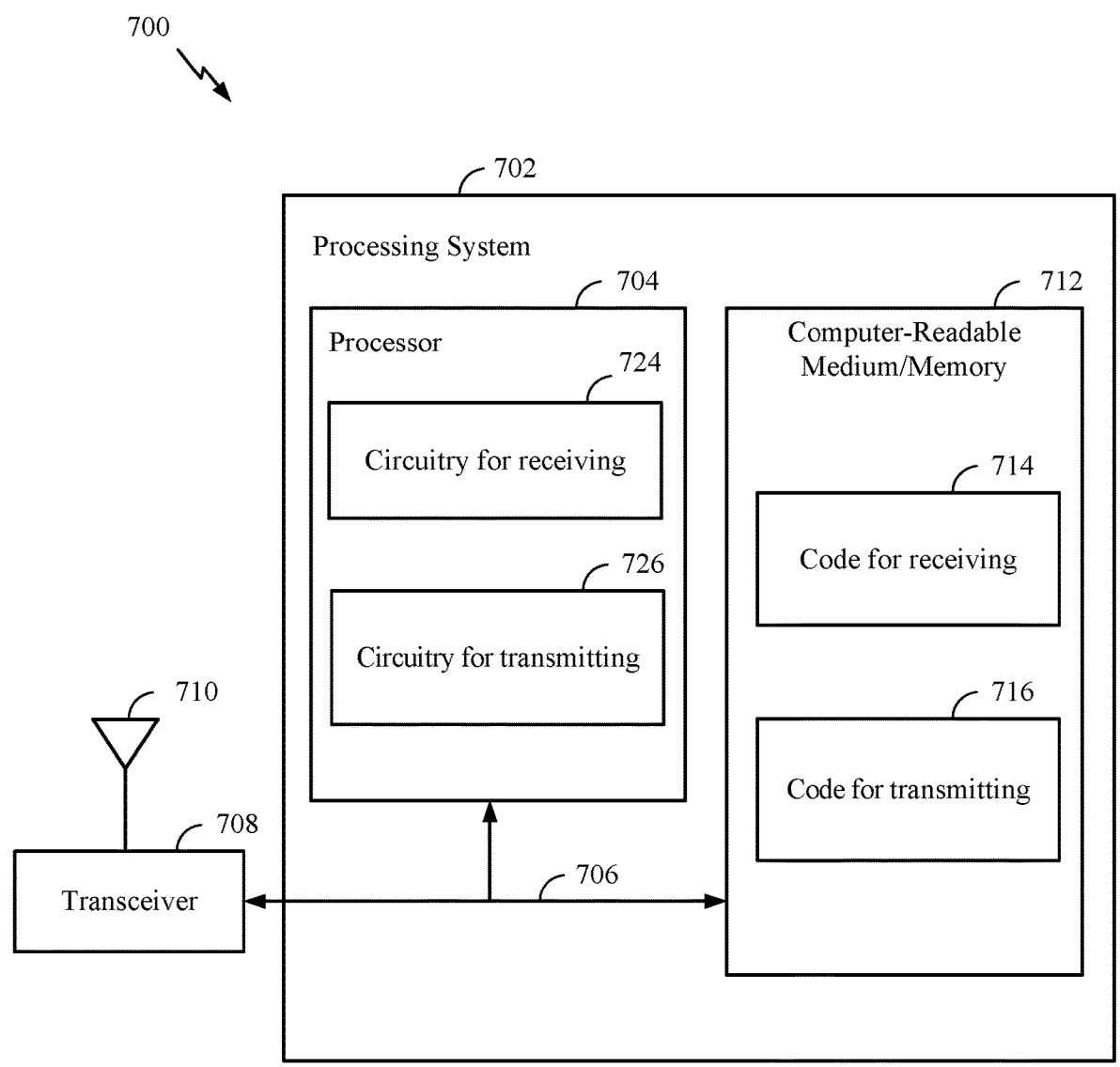
FIG. 7 illustrates an example wireless communications device configured to perform operations for the methods disclosed herein, in accordance with certain aspects of the present disclosure.

FIG. 7 illustrates a communications device 700 that may include various components (e.g., corresponding to means-plus-function components) configured to perform operations for the techniques disclosed herein, such as the operations illustrated in FIG. 5.

Communications device 700 includes a processing system 702 coupled to a transceiver 708 (e.g., a transmitter and/or a receiver). Transceiver 708 is configured to transmit and receive signals for the communications device 700 via an antenna 710, such as the various signals as described herein. Processing system 702 may be configured to perform processing functions for communications device 700, including processing signals received and/or to be transmitted by communications device 700.

Processing system 702 includes a processor 704 coupled to a computer-readable medium/memory 712 via a bus 706. In certain aspects, computer-readable medium/memory 712 is configured to store instructions (e.g., computer-executable code) that when executed by processor 704, cause processor 704 to perform the operations illustrated in FIG. 5, or other operations for performing the various techniques discussed herein for UE antenna panel distribution reporting. In some cases, the processor 704 can include one or more components of BS 102 with reference to FIG. 2 such as, for example, controller/processor 240 (including the UE antenna panel reporting component 241), transmit processor 220, receive processor 238, and/or the like. Additionally, in some cases, the computer-readable medium/memory 712 can include one or more components of BS 102 with reference to FIG. 2 such as, for example, memory 242 and/or the like.

In certain aspects, computer-readable medium/memory 712 stores code 714 for receiving and code 716 for transmitting.

In some cases, code 714 for receiving may include code for receiving a report from a user equipment (UE) including an indication of a set of antenna panels of the UE for uplink antenna panel selection at the UE, wherein set of antenna panels is based on at least one criterion.

In some cases, code 716 for transmitting may include code for transmitting, to the UE, configuration information comprising a same set of operation parameters for antenna panels of the UE in the set of antenna panels.

In some cases, code 716 for transmitting may include code for transmitting a request to the UE to report the indicated set of antenna panels of the UE.

In some cases, code 714 for receiving may include code for receiving the report including the indication of the set of antenna panels of the UE based on the transmitted request.

In certain aspects, processor 704 has circuitry configured to implement the code stored in the computer-readable medium/memory 712. For example, processor 704 includes circuitry 724 for receiving and circuitry 726 for transmitting.

In some cases, circuitry 724 for receiving may include circuitry for receiving a report from a user equipment (UE) including an indication of a set of antenna panels of the UE for uplink antenna panel selection at the UE, wherein set of antenna panels is based on at least one criterion.

In some cases, circuitry 726 for transmitting may include circuitry for transmitting, to the UE, configuration information comprising a same set of operation parameters for antenna panels of the UE in the set of antenna panels.

In some cases, circuitry 726 for transmitting may include circuitry for transmitting a request to the UE to report the indicated set of antenna panels of the UE.

In some cases, circuitry 724 for receiving may include circuitry for receiving the report including the indication of the set of antenna panels of the UE based on the transmitted request.

In some cases, the operations illustrated in FIG. 5, as well as other operations described herein for UE antenna panel distribution reporting, may be implemented by one or means-plus-function components. For example, in some cases, such operations may be implemented by means for transmitting (or means for outputting for transmission) and means for receiving (or means for obtaining).

In some cases, means for transmitting (or means for outputting for transmission) includes a transmitter and/or an antenna(s) 234 or the BS 102 illustrated in FIG. 2 and/or circuitry 726 for transmitting of the communication device 700 in FIG. 7.

In some cases, means for receiving (or means for obtaining) includes a receiver and/or an antenna(s) 234 of the BS 102 illustrated in FIG. 2 and/or circuitry 724 for receiving of the communication device 700 in FIG. 7.

Example Clauses

Implementation examples are described in the following numbered clauses:

Clause 1: A method for wireless communication by a user equipment (UE), comprising: determining a set of antenna panels of the UE for uplink antenna panel selection based on at least one criterion and transmitting a report to a base station (BS) including an indication of the determined set of antenna panels of the UE.

Clause 2: The method of Clause 1, wherein the at least one criterion comprises a distance between antenna panels included in the determined set of antenna panels.

Clause 3: The method of Clause 2, further comprising: selecting a first antenna panel to include in the determined set of antenna panels and selecting at least a second antenna panel to include in the determined set of antenna panels based on a distance between the first antenna panel and the second antenna panel being less than or equal to a threshold distance.

Clause 4: The method of Clause 3, wherein the indication of the determined set of antenna panels comprises at least one of: a first antenna panel identifier (ID) corresponding to the first antenna panel; a second antenna panel ID corresponding to the second antenna panel; or an antenna panel group ID of an antenna panel group that includes at least the first antenna panel and the second antenna panel.

Clause 5: The method of any of Clauses 3-4, wherein the threshold distance is at least one of: defined in a wireless communications standard; received in radio resource control (RRC) signaling from the BS; received in a media access control control element (MAC-CE) from the BS; or received in downlink control information (DCI) from the BS.

Clause 6: The method of and of Clauses 1-5, wherein the at least one criterion comprises a same set of operation parameters shared among antenna panels included in the set of antenna panels.

Clause 7: The method of Clause 6, wherein operation parameters included in the same set of operation parameters shared among the antenna panels included in the set of antenna panels comprise: an uplink (UL) time advance; an uplink transmission power; uplink power control parameters; or a combination thereof.

Clause 8: The method of any of Clauses 6-7, further comprising: selecting a first antenna panel to include in the set of antenna panels and selecting at least a second antenna panel to include in the set of antenna panels based on the second antenna panel sharing the same set of operation parameters with the first antenna panel.

Clause 9: The method of Clause 8, wherein the indication of the determined set of antenna panels comprises at least one of: a first antenna panel identifier (ID) corresponding to the first antenna panel; a second antenna panel ID corresponding to the second antenna panel; or an antenna panel group ID of an antenna panel group that includes at least the first antenna panel and the second antenna panel.

Clause 10: The method of any of Clauses 1-9, further comprising receiving configuration information for one or more antenna panels of the UE included in the determined set of antenna panels indicated to the BS.

Clause 11: The method of claim 10, wherein the configuration information comprises a same set of operation parameters for each antenna panel of the one or more antenna panels of the UE in the determined set of antenna panels.

Clause 12: The method of and of Clauses 1-11, wherein: the determined set of antenna panels includes at least a first antenna panel and a second antenna panel; and at least one of: a distance between the first antenna panel and the second antenna panel is less than or equal to a threshold distance; or the first antenna panel and the second antenna panel share a same set of operation parameters.

Clause 13: The method of Clause 12, further comprising: transmitting uplink signaling via the first antenna panel; detecting a maximum permissible exposure (MPE) event involving the first antenna panel; and switching to the second antenna panel to transmit the uplink signaling in response to the detected MPE event.

Clause 14: The method of Clause 13, wherein switching to the second antenna panel is based on one of: a defined rule shared between the UE and the BS; signaling transmitted from the UE to the BS indicating that the UE is switching to the second antenna panel; signaling received from the BS indicating to switch to the second antenna panel; or a determination to switch to the second antenna panel without transmission of signaling to the BS indicating that the UE is switching to the second antenna panel.

Clause 15: The method of and of Clauses 13-14, wherein the detected MPE event comprises a portion of a user of the UE blocking the first antenna panel.

Clause 16: The method of any of Clauses 1-15, further comprising receiving a request from the BS to report the indicated set of antenna panels of the UE, wherein determining the set of antenna panels of the UE is based on the received request.

Clause 17: The method of Clause 16, wherein the request is received in channel state information (CSI) reporting configuration information or a UE capability information enquiry.

Clause 18: The method of Clause 17, wherein determining the set of antenna panels of the UE based on the at least one criterion comprises performing channel measurements based on one or more reference signals (RSs) and the CSI reporting configuration information.

Clause 19: The method of Clause 18, wherein the report comprises a CSI report that further includes CSI based on the one or more channel measurements.

Clause 20: The method of any of Clauses 1-19, wherein the indication of the determined set of antenna panels of the UE comprises at least one of: a different antenna panel identifier (ID) for each antenna panel included in the determined set of antenna panels; or a group antenna panel ID for a group of antenna panels in the determined set of antenna panels.

Clause 21: The method of Clause 20, wherein at least one of the antenna panel ID or the group antenna panel ID comprises one or more of: a beam group ID; a transmission configuration indicator (TCI) state pool ID; a sounding reference signal (SRS) resource group ID; a control resource set (CORESET) pool ID; or closed loop power control index.

Clause 22. A method for wireless communication by base station (BS), comprising: receiving a report from a user equipment (UE) including an indication of a set of antenna panels of the UE for uplink antenna panel selection at the UE, wherein set of antenna panels is based on at least one criterion and transmitting, to the UE, a same set of operation parameters for antenna panels of the UE in the set of antenna panels.

Clause 23: The method of Clause 22, wherein the at least one criterion comprises a distance between the antenna panels included in the set of antenna panels.

Clause 24: The method of Clause 23, wherein: a first antenna panel is included in the set of antenna panels and at least a second antenna panel is include in the set of antenna panels based on a distance between the first antenna panel and the second antenna panel being less than or equal to a threshold distance.

Clause 25: The method of Clause 24, wherein the indication of the set of antenna panels comprises at least one of: a first antenna panel identifier (ID) corresponding to the first antenna panel; a second antenna panel ID corresponding to the second antenna panel; or an antenna panel group ID of an antenna panel group that includes at least the first antenna panel and the second antenna panel.

Clause 26: The method of any of Clauses 24-25, wherein the threshold distance is at least one of: defined in a wireless communications standard; transmitted in radio resource control (RRC) signaling to the UE; transmitted in a media access control control element (MAC-CE) to the UE; or transmitted in downlink control information (DCI) to the UE.

Clause 27: The method of any of Clauses 22-26, wherein the at least one criterion comprises a same set of operation parameters shared among antenna panels included in the set of antenna panels.

Clause 28: The method of Clause 27, wherein operation parameters included in the same set of operations parameters shared among the antenna panels included in the set of antenna panels comprise: an uplink (UL) time advance; an uplink transmission power; uplink power control parameters; or a combination thereof.

Clause 29: The method of any of Clauses 27-28, wherein: a first antenna panel is included in the set of antenna panels and at least a second antenna panel is included in the set of antenna panels based on the second antenna panel sharing the same set of operation parameters with the first antenna panel.

Clause 30: The method of Clause 29, wherein the indication of the set of antenna panels comprises at least one of: a first antenna panel identifier (ID) corresponding to the first antenna panel; a second antenna panel ID corresponding to the second antenna panel; or an antenna panel group ID of an antenna panel group that includes at least the first antenna panel and the second antenna panel.

Clause 31: The method of any of Clauses 22-30, further comprising transmitting a request to the UE to report the indicated set of antenna panels of the UE, wherein receiving the report including the indication of the set of antenna panels of the UE is based on the transmitted request.

Clause 32: The method of Clause 31, wherein the request is transmitted in channel state information (CSI) reporting configuration information or a UE capability information enquiry.

Clause 33: The method of Clause 32, wherein the report comprises a CSI report that further includes CSI based on one or more channel measurements performed at the UE.

Clause 34: The method of any of Clauses 22-33, wherein the indication of the set of antenna panels of the UE comprises at least one of: a different antenna panel identifier (ID) for each antenna panel included in the set of antenna panels or a group antenna panel ID for a group of antenna panels in the set of antenna panels.

Clause 34: The method of claim 34, wherein at least one of the antenna panel ID or the group antenna panel ID comprises one or more of: a beam group ID; a transmission configuration indicator (TCI) state pool ID; a sounding reference signal (SRS) resource group ID; a control resource set (CORESET) pool ID; or closed loop power control index.

Clause 35: A processing system for wireless communication, comprising: a memory comprising computer-executable instructions; one or more processors configured to execute the computer-executable instructions and cause the processing system to perform a method in accordance with any one of Clauses 1-34.

Clause 36: An apparatus for wireless communication, comprising means for performing a method in accordance with any one of Clauses 1-34.

Clause 37: A non-transitory computer-readable medium for wireless communication comprising computer-executable instructions that, when executed by one or more processors of a processing system, cause the processing system to perform a method in accordance with any one of Clauses 1-34.

Clause 38: A computer program product for wireless communication embodied on a computer-readable storage medium comprising code for performing a method in accordance with any one of Clauses 1-34.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmW), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 240 of the BS 102 includes a UE antenna panel reporting component 241 that may be configured to perform the operations shown in FIG. 5, as well as other operations described herein for UE antenna panel distribution reporting. As shown in FIG. 2, the controller/processor 280 of the UE 104 includes a UE antenna panel reporting component 281 that may be configured to perform the operations shown in FIG. 4, as well as other operations described herein for UE antenna panel distribution reporting. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of user equipment (UE) antenna panel distribution reporting in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

The invention claimed is:

1. A method for wireless communication by a user equipment (UE), comprising:
   determining a set of antenna panels of the UE for uplink antenna panel selection based on whether antenna panels included in the determined set of antenna panels share a same set of operation parameters, wherein operation parameters in the same set of operation parameters include at least one of an uplink (UL) time advance, an uplink transmission power, or uplink power control parameters; and
   transmitting a report to a base station (BS) indicating the determined set of antenna panels of the UE.

2. The method of claim 1, wherein determining the set of antenna panels is based further on a distance between the antenna panels included in the determined set of antenna panels.

3. The method of claim 2, further comprising:
   selecting a first antenna panel to include in the determined set of antenna panels; and
   selecting at least a second antenna panel to include in the determined set of antenna panels based on a distance between the first antenna panel and the second antenna panel being less than or equal to a threshold distance.

4. The method of claim 3, wherein the indication of the determined set of antenna panels comprises at least one of:
   a first antenna panel identifier (ID) corresponding to the first antenna panel;
   a second antenna panel ID corresponding to the second antenna panel; or
   an antenna panel group ID of an antenna panel group that includes at least the first antenna panel and the second antenna panel.

5. The method of claim 3, wherein the threshold distance is at least one of:
- defined in a wireless communications standard;
- received in radio resource control (RRC) signaling from the BS;
- received in a media access control control element (MAC-CE) from the BS; or
- received in downlink control information (DCI) from the BS.

6. The method of claim 1, further comprising:
- selecting a first antenna panel to include in the set of antenna panels; and
- selecting at least a second antenna panel to include in the set of antenna panels based on the second antenna panel sharing the same set of operation parameters with the first antenna panel.

7. The method of claim 6, wherein the indication of the determined set of antenna panels comprises at least one of:
- a first antenna panel identifier (ID) corresponding to the first antenna panel;
- a second antenna panel ID corresponding to the second antenna panel; or
- an antenna panel group ID of an antenna panel group that includes at least the first antenna panel and the second antenna panel.

8. The method of claim 1, further comprising receiving configuration information for one or more antenna panels of the UE included in the determined set of antenna panels indicated to the BS.

9. The method of claim 8, wherein the configuration information comprises a same set of operation parameters for each antenna panel of the one or more antenna panels of the UE in the determined set of antenna panels.

10. The method of claim 1, wherein:
- the determined set of antenna panels includes at least a first antenna panel and a second antenna panel; and
- at least one of:
  - a distance between the first antenna panel and the second antenna panel is less than or equal to a threshold distance; or
  - the first antenna panel and the second antenna panel share a same set of operation parameters.

11. The method of claim 10, further comprising:
- transmitting uplink signaling via the first antenna panel;
- detecting a maximum permissible exposure (MPE) event involving the first antenna panel; and
- switching to the second antenna panel to transmit the uplink signaling in response to the detected MPE event, wherein switching to the second antenna panel is based on one of:
  - a defined rule shared between the UE and the BS;
  - signaling transmitted from the UE to the BS indicating that the UE is switching to the second antenna panel;
  - signaling received from the BS indicating to switch to the second antenna panel; or
  - a determination to switch to the second antenna panel without transmission of signaling to the BS indicating that the UE is switching to the second antenna panel.

12. The method of claim 1, further comprising receiving a request from the BS to report the indicated set of antenna panels of the UE, wherein determining the set of antenna panels of the UE is based on the received request.

13. The method of claim 12, wherein the request is received in channel state information (CSI) reporting configuration information or a UE capability information enquiry.

14. The method of claim 1, wherein the indication of the determined set of antenna panels of the UE comprises at least one of:
- a different antenna panel identifier (ID) for each antenna panel included in the determined set of antenna panels; or
- a group antenna panel ID for a group of antenna panels in the determined set of antenna panels.

15. The method of claim 14, wherein at least one of the antenna panel ID or the group antenna panel ID comprises one or more of:
- a beam group ID;
- a transmission configuration indicator (TCI) state pool ID;
- a sounding reference signal (SRS) resource group ID;
- a control resource set (CORESET) pool ID; or
- closed loop power control index.

16. A method for wireless communication by base station (BS), comprising:
- receiving a report from a user equipment (UE) indicating a set of antenna panels of the UE for uplink antenna panel selection at the UE, wherein set of antenna panels is based on antenna panels included in the set of antenna panels sharing a same set of operation parameters, wherein operation parameters in the same set of operation parameters include at least one of an uplink (UL) time advance, an uplink transmission power, or uplink power control parameters; and
- transmitting, to the UE, configuration information indicating a same set of operation parameters for antenna panels of the UE in the set of antenna panels.

17. The method of claim 16, wherein the set of antenna panels is based further on a distance between the antenna panels included in the set of antenna panels.

18. The method of claim 17, wherein:
- a first antenna panel is included in the set of antenna panels; and
- at least a second antenna panel is include in the set of antenna panels based on a distance between the first antenna panel and the second antenna panel being less than or equal to a threshold distance.

19. The method of claim 18, wherein the indication of the set of antenna panels comprises at least one of:
- a first antenna panel identifier (ID) corresponding to the first antenna panel;
- a second antenna panel ID corresponding to the second antenna panel; or
- an antenna panel group ID of an antenna panel group that includes at least the first antenna panel and the second antenna panel.

20. The method of claim 18, wherein the threshold distance is at least one of:
- defined in a wireless communications standard;
- transmitted in radio resource control (RRC) signaling to the UE;
- transmitted in a media access control control element (MAC-CE) to the UE; or
- transmitted in downlink control information (DCI) to the UE.

21. The method of claim 16, wherein:
- a first antenna panel is included in the set of antenna panels; and
- at least a second antenna panel is included in the set of antenna panels based on the second antenna panel sharing the same set of operation parameters with the first antenna panel.

22. The method of claim 21, wherein the indication of the set of antenna panels comprises at least one of:
- a first antenna panel identifier (ID) corresponding to the first antenna panel;
- a second antenna panel ID corresponding to the second antenna panel; or
- an antenna panel group ID of an antenna panel group that includes at least the first antenna panel and the second antenna panel.

23. The method of claim 16, further comprising transmitting a request to the UE to report the indicated set of antenna panels of the UE, wherein receiving the report including the indication of the set of antenna panels of the UE is based on the transmitted request, wherein the request is transmitted in channel state information (CSI) reporting configuration information or a UE capability information enquiry.

24. The method of claim 16, wherein:
- the indication of the set of antenna panels of the UE comprises at least one of:
  - a different antenna panel identifier (ID) for each antenna panel included in the set of antenna panels; or
  - a group antenna panel ID for a group of antenna panels in the set of antenna panels; and
- at least one of the antenna panel ID or the group antenna panel ID comprises one or more of:
  - a beam group ID;
  - a transmission configuration indicator (TCI) state pool ID;
  - a sounding reference signal (SRS) resource group ID;
  - a control resource set (CORESET) pool ID; or
  - closed loop power control index.

25. An apparatus for wireless communication by a user equipment (UE), comprising:
- a memory comprising computer-executable instructions; and
- one or more processors configured to execute the computer-executable instructions and cause the one or more processors to:
  - determine a set of antenna panels of the UE for uplink antenna panel selection based on whether antenna panels included in the determined set of antenna panels share a same set of operation parameters, wherein operation parameters in the same set of operation parameters include at least one of an uplink (UL) time advance, an uplink transmission power, or uplink power control parameters; and
  - transmit a report to a base station (BS) indicating the determined set of antenna panels of the UE.

26. An apparatus for wireless communication by a base station (BS), comprising:
- a memory comprising computer-executable instructions; and
- one or more processors configured to execute the computer-executable instructions and cause the one or more processors to:
  - receive a report from a user equipment (UE) indicating a set of antenna panels of the UE for uplink antenna panel selection at the UE, wherein set of antenna panels is based on antenna panels included in the set of antenna panels sharing a same set of operation parameters, wherein operation parameters in the same set of operation parameters include at least one of an uplink (UL) time advance, an uplink transmission power, or uplink power control parameters; and
  - transmit, to the UE, configuration information indicating a same set of operation parameters for antenna panels of the UE in the set of antenna panels.

* * * * *